UNITED STATES PATENT OFFICE.

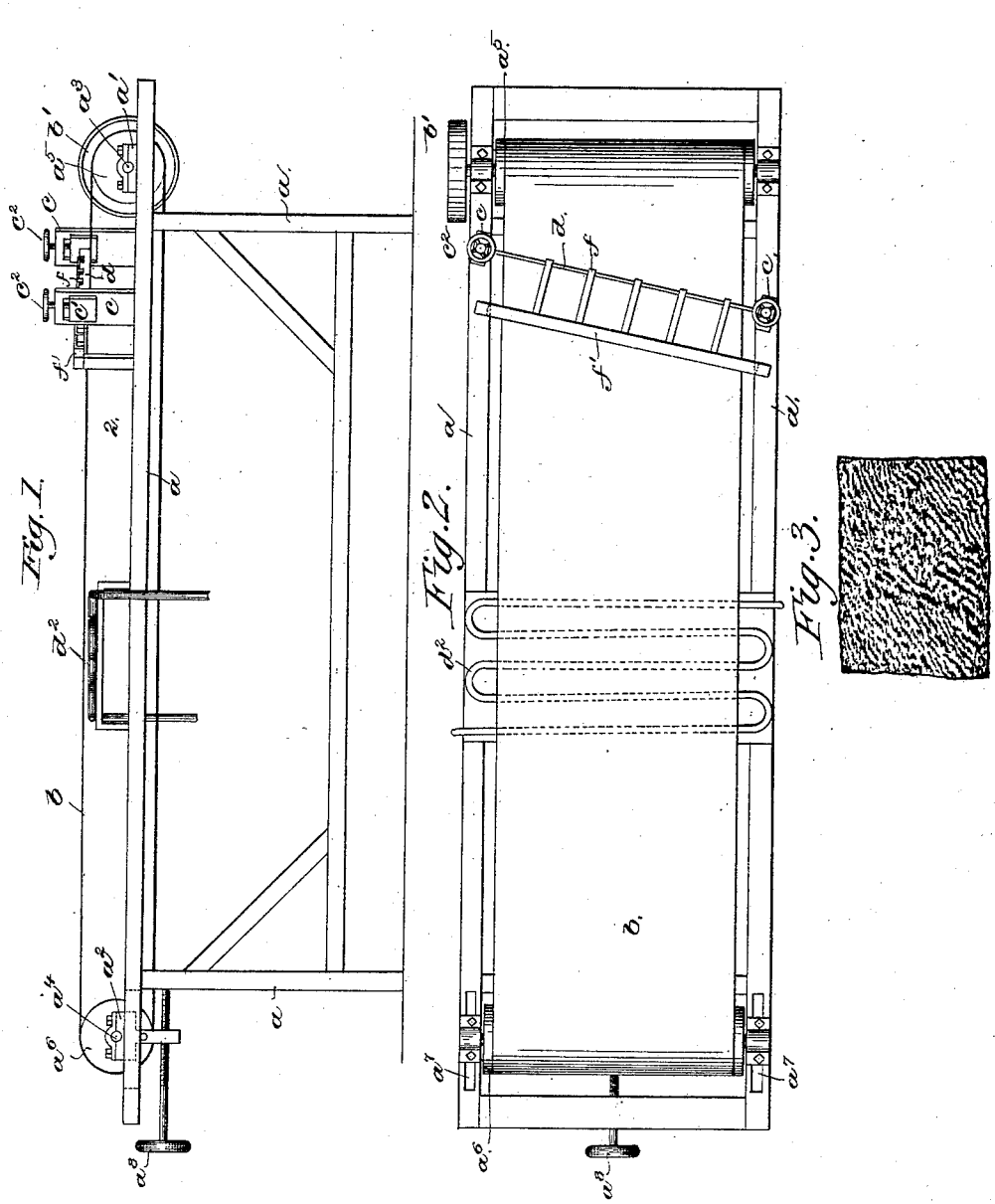

ARTHUR W. POPE, OF BOSTON, MASSACHUSETTS.

METHOD OF PEBBLING CLOTH OR OTHER WEB.

SPECIFICATION forming part of Letters Patent No. 354,581, dated December 21, 1886.

Application filed July 12, 1886. Serial No. 207,757. (No model.)

*To all whom it may concern:*

Be it known that I, ARTHUR W. POPE, of Boston, county of Suffolk, and State of Massachusetts, have invented an Improvement in Methods in Pebbling Cloth or other Web, of which the following description, in connection with the accompanying drawings, is a specification, like letters on the drawings representing like parts.

This invention relates to an improvement in the art or method of pebbling cloth or other web coated with rubber or other equivalent compound.

As heretofore practiced and known to me, the cloth or other web is passed about rollers and its ends are connected to form an endless belt, the revolution of the said rollers causing the said endless belt to travel. As the endless belt is thus moved, it has applied to it a solution of india-rubber or other water-proof substance dissolved in benzine or other suitable solvent, the said india-rubber solution being applied in successive layers until the desired amount or thickness has been supplied to the cloth or web. During its revolution the endless belt of cloth or other web is passed beneath a blade or knife extended across the said endless belt, and by which the india-rubber or other water-proof substance is evenly laid or distributed thereon. When the india-rubber or other water-proof substance is of the desired thickness on the endless belt of cloth or web, the said endless belt is cut and removed from the rollers, and while the india-rubber or other water-proof substance is still tacky, or but partially dried, the said belt of cloth or other web is passed through a second apparatus, wherein the tacky or partially-dried india-rubber surface is subjected to embossing rolls or cylinders, to produce on it a pebbled surface.

In accordance with my invention the pebbled surface on the cloth or other web is produced in the same apparatus in which the solution of india-rubber or other water-proof substance is applied to the web.

My invention consists, essentially, in applying india-rubber or other equivalent water-proof substance to an endless belt of cloth or other web, and then subjecting the said india-rubber or equivalent surface to the action of a vibrating blade, which destroys the said coating and leaves a pebbled surface on the cloth or web, as will be described.

Figure 1 is a side elevation of an apparatus by which to produce a pebbled surface on cloth or other web in accordance with my invention; Fig. 2, a top or plan view of Fig. 1, and Fig. 3 a portion of a web having a pebbled surface produced in accordance with my invention.

The frame-work $a$, of any suitable construction, supports at its opposite end journal-boxes $a'$ $a^2$, for shafts $a^3$ $a^4$, on which are mounted rollers $a^5$ $a^6$, the journal-bearing $a^2$ being herein shown as adjustable in slots $a^7$ by means of a screw, $a^8$. The rollers $a^5$ $a^6$ have passed around them an endless belt, $b$, of cloth or other web upon which it is desired to produce a pebbled surface. The endless belt $b$ is made to travel by means of a pulley, $b'$, on the shaft $a^\times$, the said pulley being driven in any usual manner by a belt. (Not shown.)

The frame-work $a$ has erected upon it, on opposite sides of the apparatus, uprights $c$, each provided, as herein shown, with a slot to receive a block, $c'$, firmly secured therein by set-screws $c^2$. The blocks $c'$ have fixed to them the end of a knife or blade, $d$, constituting the vibrator by which the pebbled surface is obtained.

In the operation of my apparatus the solution of india-rubber or other water-proof substance may be applied to the endless belt $b$ of cloth or other web in any well-known or suitable manner, it being applied to the cloth or web before the latter is passed beneath the vibrator. As the india-rubber or other water-proof substance is applied to the endless belt $b$, the said belt is made to travel beneath the knife or blade $d$ by rotating the rollers $a^5$ $a^6$. As the endless belt is passed beneath the knife or blade $d$ in the direction of arrow 2, the india-rubber or other water-proof substance, which has been previously applied to the web in front of the knife $d$, is evenly laid or distributed on the belt $b$ by the said knife, the latter being in such close proximity to the web as to scrape upon it and permit but a small amount of the india-rubber to pass beneath it.

The india-rubber upon the endless belt is dried, as herein shown, by means of a steam-coil, $d^2$, supplied with steam from any suitable or convenient source.

When the required thickness of india-rubber or other material has been applied to the surface of the cloth or web, the rotation of the belt is preferably stopped, and the india-rubber or other material which has accumulated in front of the vibrator is scraped off or otherwise removed and the belt again set in motion. As the belt with its tacky or partially-dried surface of india-rubber or other material is again passed beneath the knife, the latter binds somewhat upon the cloth, so that it is made to vibrate, the vibration of the knife producing the pebbled surface shown in Fig. 3.

In order to produce nodes of various length due to the vibration of the knife, the said knife may be clamped in one or more parts of its length, as herein shown, by means of the clamping-arms $f$, secured to the bar $f'$, extended across the apparatus, and supported, as herein shown, upon the frame-work $a$, the variation in the length of the said nodes producing a varied appearance of the pebbled surface.

The tension of the endless belt may be regulated by the set-screw $a^8$.

I claim—

1. That improvement in the art or method of pebbling cloth or other web which consists in applying india-rubber or other equivalent water-proof substance to an endless belt of cloth or other web, and then subjecting the said india-rubber or equivalent surface to the action of a vibrating blade, which destroys the said coating and leaves a pebbled surface on the cloth or web, substantially as described.

2. That improvement in the art or method of pebbling cloth or other web which consists in applying india-rubber or other water-proof substance to an endless belt or other web; second, causing the said endless belt to travel beneath a knife or blade until the desired amount of india-rubber or other water-proof substance has been applied thereto, and, lastly, causing the said endless belt to again travel beneath the said knife or blade, and the said knife or blade to vibrate, substantially as described.

3. That improvement in the art or method of pebbling cloth or other web having an india-rubber or equivalent waterproofing compound applied to it which consists in moving the said coated belt under a blade or vibrator after the required quantity of india-rubber or equivalent waterproofing compound has been applied to it, and while the said coating is yet tacky, the said tacky surface acting to cause the said blade to vibrate, all substantially as set forth.

In testimony whereof I have signed my name to this specification in the presence of two subscribing witnesses.

ARTHUR W. POPE.

Witnesses:
G. W. GREGORY,
F. L. EMERY.